US008971929B2

United States Patent
Li et al.

(10) Patent No.: US 8,971,929 B2
(45) Date of Patent: Mar. 3, 2015

(54) METHOD AND SYSTEM FOR TRANSMITTING LOCATION DATA

(75) Inventors: Hui Li, Shenzhen (CN); Liang Shan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 182 days.

(21) Appl. No.: 13/637,623

(22) PCT Filed: Mar. 25, 2011

(86) PCT No.: PCT/CN2011/072165
§ 371 (c)(1),
(2), (4) Date: Sep. 26, 2012

(87) PCT Pub. No.: WO2011/120402
PCT Pub. Date: Oct. 6, 2011

(65) Prior Publication Data
US 2013/0017844 A1 Jan. 17, 2013

(30) Foreign Application Priority Data
Apr. 2, 2010 (CN) .......................... 2010 1 0157465

(51) Int. Cl.
*H04W 24/00* (2009.01)
*H04W 4/00* (2009.01)
*H04M 1/66* (2006.01)
*H04M 3/42* (2006.01)
*G01S 19/49* (2010.01)
*G01S 19/25* (2010.01)
*H04W 4/02* (2009.01)
*H04W 4/20* (2009.01)
*H04W 8/08* (2009.01)

(52) U.S. Cl.
CPC *H04W 4/02* (2013.01); *H04W 4/20* (2013.01); *H04W 8/08* (2013.01)

USPC ..................... 455/456.3; 455/411; 455/456.1; 455/456.2; 455/456.5; 455/456.6; 455/433; 455/435.1; 342/357.32; 342/357.64; 370/338

(58) Field of Classification Search
USPC ............. 455/411, 456.1, 456.2, 456.3, 456.5, 455/456.6, 433, 435.1; 370/338; 342/357.32, 357.64
See application file for complete search history.

(56) References Cited

U.S. PATENT DOCUMENTS

2011/0140962 A1* 6/2011 McNamara et al. ..... 342/357.64

FOREIGN PATENT DOCUMENTS

| CN | 1859740 A | 11/2006 |
| CN | 101072430 A | 11/2007 |
| CN | 101199227 A | 6/2008 |
| CN | 101639525 A | 2/2010 |

OTHER PUBLICATIONS

Method for transmitting location information, Young Park Eun, Hi Sim Dong, Young Huh Ji and Jeung Joe Moon, Jun. 11, 2008.*

* cited by examiner

*Primary Examiner* — Inder Mehra
(74) *Attorney, Agent, or Firm* — Koppel, Patrick, Heybl & Philpott (57) ABSTRACT

The disclosure discloses a method and a system for transmitting location data. The method comprises at least one step of that: the location data is transmitted between a first terminal and a second terminal; the location data is transmitted between a first location server and a second location server; and the location data is transmitted between a third terminal and a third location server, wherein the location data comprises: assistance location data and/or position data. According to the technical solution provided by the disclosure, the location function between two terminals supporting Security User Plane Location (SUPL) can be realized, and some novel assistance location data can be transmitted.

17 Claims, 7 Drawing Sheets

METHOD AND SYSTEM FOR TRANSMITTING LOCATION DATA

This is a National Stage Application of PCT/CN2011/072165 filed Mar. 25, 2011, published as WO 2011/120402 A1, and claiming priority from CN201010157465.X filed Apr. 2, 2010.

FIELD OF THE INVENTION

The disclosure relates to the communication field, and particularly to a method and a system for transmitting location data.

BACKGROUND OF THE INVENTION

In a Security User Plane Location (SUPL) service, from the standpoint of market deployment, the SUPL technical specification defined by the Open Mobile Alliance (OMA) organization is mainly to develop a location service based on the technology of a user plane, which mainly includes the function of transmitting assistance location data. The principle of the conventional SUPL technology is described below in conjunction with FIG. 1.

Figure 1:
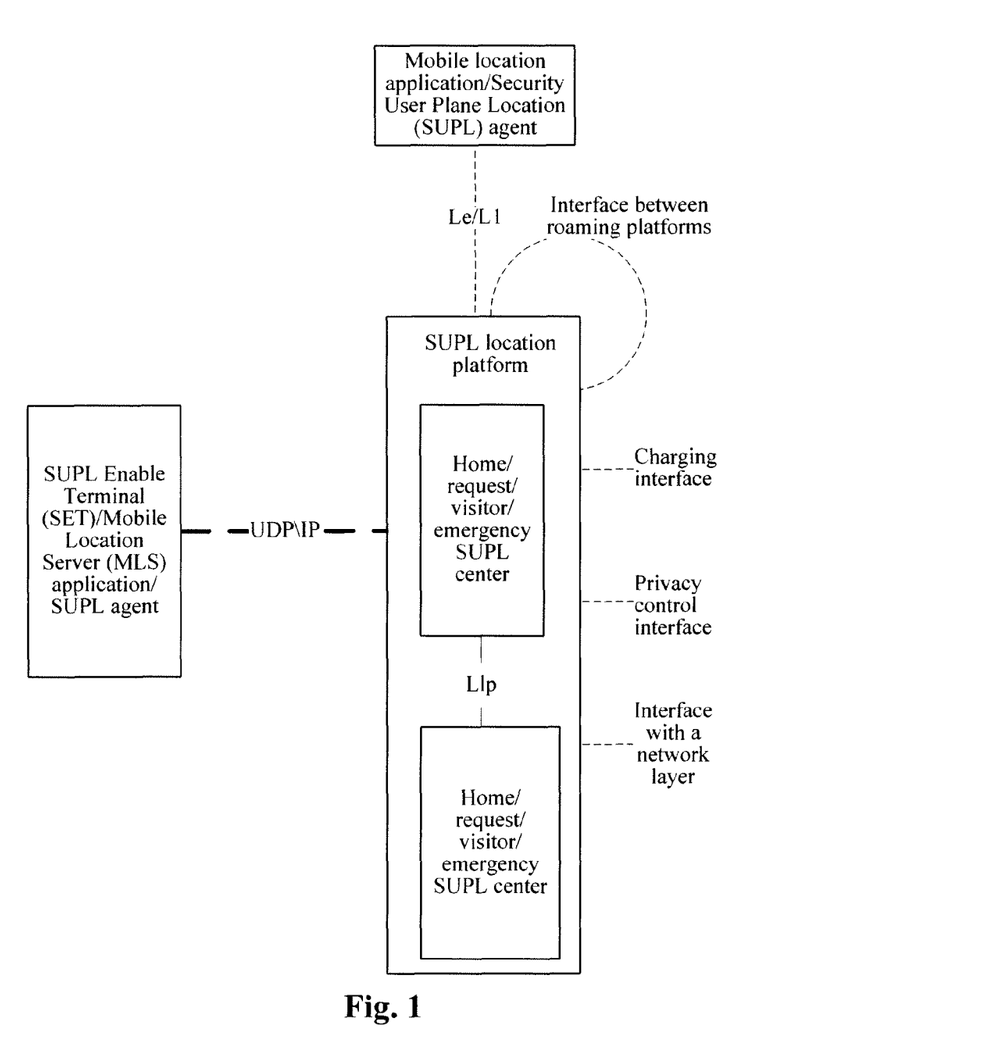
FIG. 1 is a diagram showing the architecture of an SUPL system in the related arts.

As shown in FIG. 1, according to the SUPL technology defined by the OMA location group, the location system mainly comprises three functional entities: an SUPL service agent, an SUPL Server (SLP) and an SUPL Enable Terminal (SET).

The SET is a terminal that is being located. The SET establishes an SUPL session connection with an SUPL platform (i.e., an SUPL server) in the mode of User Datagram Protocol (UDP)/Internet Protocol (IP), with the corresponding functional interface being the Lup interface and the protocol being the SUPL protocol. Hence, the position information of the SET can be acquired by the SUPL protocol.

The SET may comprise a Mobile Location Server (MLS) application or an SUPL agent. Both the MLS application and the SUPL agent may request the SET to perform a location service through a private interface on a mobile phone terminal or an interface conforming to the Mobile Location Protocol (MLP).

The interface between the SUPL platform and the mobile location application\SUPL agent of a network side is an Le/L1 interface, and the corresponding protocol is the MLP or the Location in Session Initiation Protocol (LOCSIP). In this case, the third-party application system\SUPL agent requests the SUPL platform to perform SET location service through the Le/L1 interface.

The SUPL platform comprises two functional entities: an SUPL Center (SLC) and an SUPL Positioning Center (SPC). When the SUPL platform works in a non-proxy mode, the SLC and the SPC are separated and have a separate interface with the SET respectively. When the SUPL platform works in a proxy mode, there is only one functional interface between the location platform and the SET, i.e., the interface between the SLC and the SET. There is no interface between the SPC and the SET. The SLC serves as the agent between the SPC and the SET. The interface between the SLC and the SPC is the LIP. Due to the roaming of the SET, the SUPL platform may respectively serve as: a roaming location platform, a request location platform, a home location platform, an emergency location platform and the like. Correspondingly, both the SLC and the SPC also have these functions. Besides, the SUPL platform further supports other interfaces, such as, a roaming interface between platforms, an interface between a platform and a computation server, an interface between a platform and a private server, and an interface between a platform and a network layer.

The SUPL agent may provide the application with a function of accessing the location service, and the SUPL agent is the first service access point provided to the outside by the location service system. The application requests to locate one or more SETs through the SUPL agent.

Based on the conventional OMA SUPL architecture described above, the technology for transmitting location data between the SLP and the SET supported by the conventional SUPL technology is described below in conjunction with FIG. 2 and FIG. 3 respectively. It should be noted that the location data here comprises assistance location data and/or position data and the like. The assistance location data comprises: atmospheric model (predicted or real-time), earth magnetic field data, virtual assistance parameter measurements, Advanced Global Navigation Satellite System (AGNSS) data, fingerprint data, radiomap data, measurement data and the like.

Figure 2:
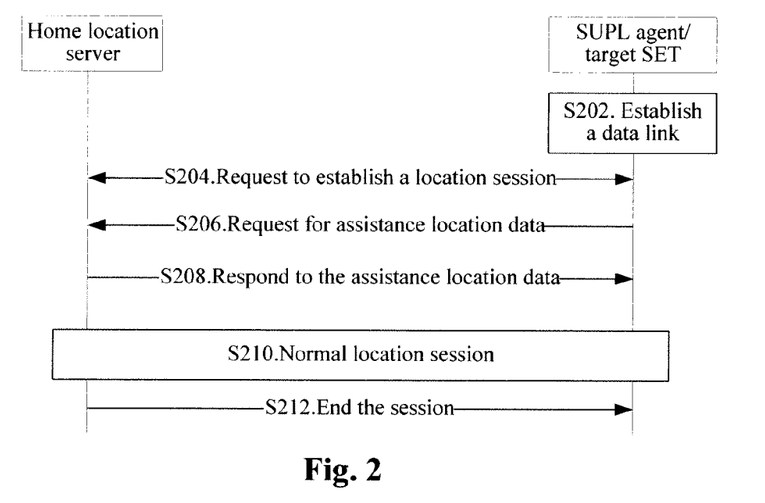
FIG. 2 is a diagram showing the flow of acquiring assistance location data by an SET when a location session is initiated by a terminal side in the related arts.

As shown in FIG. 2, in the conventional SUPL technology, during a location session initiated by the terminal side, the SET acquires the assistance location data, which is returned by SUPL POS through an SUPL POS INIT request. The SET position data may be computed either by the SET or by the SLP in the SUPL POS process. Finally, the SET acquires the position data, mainly comprising the following steps.

Step S202: The SUPL agent of the SET receives a location request to request the SET to establish a data link.

Step S204: The SET requests a Home SLP (H-SLP) to establish a location session and negotiates the location capability.

Step S206: A target SET sends an SUPL POS INIT message to the H-SLP, wherein the SET can specify the required assistance location data in the message.

Step S208: The H-SLP interacts with the SET by multiple SUPL POS messages, wherein the POS message may carry the required assistance data of the SET.

Step S210: The H-SLP interacts with the target SET by multiple sessions, and the H-SLP or the SET is responsible for position computation and may send the position information to the other party.

Step S212: The H-SLP sends a session ending message to the SUPL agent, and the flow ends.

Figure 3:
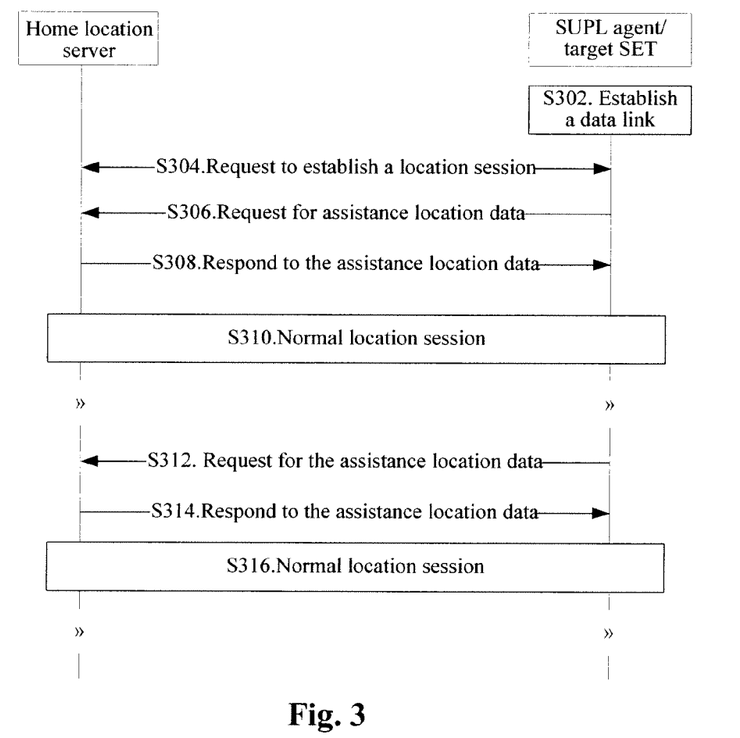
FIG. 3 is a diagram showing the flow of acquiring assistance location data by an SET when a long location session with an H-SLP is initiated by a terminal in the related arts.

As shown in FIG. 3, during the long location session with the H-SLP initiated by the terminal, such as a trigger type location service, the assistance location data is requested, and the position data is transmitted. This process mainly comprises the following steps.

Step S302: The SUPL agent of the SET receives a location request to request the SET to establish a data link.

Step S304: The SET requests the H-SLP to establish a location session and negotiates the location capability.

Step S306: The target SET sends an SUPL POS INIT message to the H-SLP, wherein the SET can specify the required assistance location data in the message.

Step S308: The H-SLP interacts with the SET by multiple SUPL POS messages, wherein the POS message may carry the required assistance data of the SET.

Step S310: The H-SLP interacts with the target SET, wherein the interaction message, such as the SUPL POS message, carries the assistance location parameter.

Step S312: After some time, such as in the situation of periodic location or triggered by an event, the SET sends the SUPL POS INIT message to the H-SLP again, wherein the SET can specify the required assistance location data in the message.

Step S314: The H-SLP interacts with the SET by multiple SUPL POS messages, wherein the POS message may carry the required assistance data of the SET.

Step S316: The H-SLP interacts with the target SET, wherein the interaction message, such as the SUPL POS message, carries the assistance location parameter.

It can be seen from what described above that in the related arts, the SUPL technology supports one-time, multiple or continuous (in a solicited mode) location data transmission between the H-SLP and the SET. However, the SET cannot transmit location data with one or more SETs, nor can the assistance data be transmitted between the SET and the SLP for one or more times or continuously in an unsolicited mode.

SUMMARY OF THE INVENTION

In order to solve the problem in the related arts that location process between two SETs cannot be implemented or the transmission of various novel assistance location data cannot be supported as the terminal supporting the SUPL cannot transmit the location data with one and more terminals supporting the SUPL, nor can the location data be transmitted between a terminal and a location server or between a first location server and a second location server. Therefore, the main objective of the disclosure is to provide a method and a system for transmitting location data so as to solve at least one of the problems.

In one aspect, the disclosure provides a method for transmitting location data.

The method for transmitting the location data comprises at least one step of: transmitting the location data between a first terminal and a second terminal; transmitting the location data between a first location server and a second location server; and transmitting the location data between a third terminal and a third location server, wherein the location data comprises: assistance location data and/or position data The first terminal, the second terminal, the third terminal, the first location server, the second location server and the third location server support the SUPL protocol, and/or the Long Term Evolution Positioning Protocol (LPP), and/or the Long Term Evolution Positioning Protocol Extension (LPPe).

Each of the first location server, the second location server and the third location server comprises at least one of: a home location server, a visitor location server and an emergency location server.

The location data is transmitted between the first terminal and the second terminal, between the third terminal and third location server, and between the first location server and second location server in at least one mode of: a point-to-point short message transmission mode, a point-to-point multimedia message transmission mode, a Hyper Text Transmission Protocol (HTTP) transmission mode, an e-mail transmission mode, a file transmission protocol mode, a transmission control protocol mode, a User Datagram Protocol (UDP) mode, an SUPL transmission mode, an LPP transmission mode, and an LPPe transmission mode.

The location data transmission between the first terminal and second terminal comprises: transmitting the location data to the second terminal by the first terminal through a location server corresponding to the first terminal and a location server corresponding to the second terminal in the SUPL transmission mode and/or the LPP transmission mode and/or the LPPe transmission mode.

The location data is transmitted between the first terminal and second terminal in a continuous transmission mode or a discontinuous transmission mode.

The location server corresponding to the first terminal and the location server corresponding to the second terminal are the same location server.

The location data is transmitted from the third terminal to the third location server, or from the third location server to the third terminal, or between the first location server and the second location server in the continuous transmission mode or the discontinuous transmission mode.

The discontinuous transmission mode comprises a periodic transmission mode.

After the third location server transmits the location data to the third terminal, the method further comprises: transmitting the location data to another terminal by the third terminal through a location server corresponding to the third terminal and a location server corresponding to said another terminal in the SUPL transmission mode and/or the LPP transmission mode and/or the LPPe transmission mode.

The location server corresponding to the third terminal and the location server corresponding to said another terminal are the same location server.

In another aspect, the disclosure further provides a system for transmitting location data.

The system for transmitting the location data comprises at least one of: a first terminal and a second terminal, between which the location data is transmitted; a first location server and a second location server, between which the location data is transmitted; and a third terminal and a third location server, between which the location data is transmitted, wherein the location data comprises assistance location data and/or position data.

The first terminal, the second terminal, the third terminal, the first location server, the second location server and the third location server support the SUPL protocol, and/or the Long Term Evolution Positioning Protocol (LPP), and/or the Long Term Evolution Positioning Protocol Extension (LPPe).

Each of the first location server, the second location server and the third location server comprises at least one of: a home location server, a visitor location server and an emergency location server.

The system further comprises: a location server corresponding to the first terminal and a location server corresponding to the second terminal; the first terminal is configured to transmit the location data through the location server corresponding to the first terminal and the location server corresponding to the second terminal in the SUPL transmission mode and/or the LPP transmission mode and/or the LPPe transmission mode, and the second terminal is configured to receive the location data from the first terminal.

The location server corresponding to the first terminal and the location server corresponding to the second terminal are the same location server.

The system further comprises: a location server corresponding to the third terminal, and a location server corresponding to another terminal; and the third terminal is further configured to transmit the location data received from the third location server to said another terminal through the location server corresponding to the third terminal and the location server corresponding to said another terminal in the SUPL transmission mode and/or the LPP transmission mode and/or the LPPe transmission mode.

The location server corresponding to the third terminal and the location server corresponding to said another terminal are the same location server.

Through the disclosure, the location data is transmitted between the first and second terminals, and/or the third terminal and third location server, and/or the first and second location servers. The location data comprises: assistance location data and/or position data. The solution of the disclosure can solve the problems in the related arts that the location process between two terminals cannot be implemented and the transmission of some novel assistance location data cannot be supported as the terminal supporting the SUPL cannot transmit the location data with one and more terminals supporting the SUPL, nor can the location data be transmitted between a terminal and a location server or between a first location server and a second location server. Therefore, the location function between two terminals can be realized and the transmission of some novel assistance location data is implemented.

Other features and advantages of the disclosure will be described in the following specification and partially become obvious from the specification or can be known by implementing the disclosure. The objective and other advantages of the disclosure can be realized and acquired by the specified structures in the written specification, claims and drawings.

BRIEF DESCRIPTION OF THE DRAWINGS

The drawings described herein are used for providing a further understanding of the disclosure and constituting one part of this application. The exemplary embodiments of the disclosure and the description thereof are for explaining the disclosure and should not be used for limiting the disclosure. In the drawings.

DETAILED DESCRIPTION OF THE EMBODIMENTS

It should be noted that the embodiments of the disclosure and features therein can be combined with each other, if there is no conflict. The disclosure will be explained hereinafter in detail with reference to the drawings and in conjunction with the embodiments.

In an SUPL system, it is necessary to provide a system for transmitting location data in order that an SET can transmit location data with one or more SETs. The system mainly comprises: a first terminal (SET1) and a second terminal (SET2) which transmit location data with each other. The system is explained below in conjunction with the method for transmitting the location data according to the embodiment of the disclosure.

The method for transmitting the location data according to the embodiment of the disclosure comprises at least one of the following:

(1) the location data is transmitted between the first and second terminals;

(2) the location data is transmitted between the first and second location servers; and (3) the location data is transmitted between the third terminal and the third location server, wherein the location data comprises: assistance location data and/or position data.

In the related arts, the SET can acquire location data from the H-SLP only in a solicited (request-response) mode. The H-SLP cannot transmit the location data in real time, and the terminal supporting the SUPL cannot transmit the location data with one or more terminals supporting the SUPL. Hence, the location function between two terminals cannot be realized. Whereas, through the embodiment, the location function between two terminals supporting the SUPL can be realized, and some novel assistance location data can be transmitted.

Preferably, the location data may further comprise the valid time range of the location data, such as the combination of any two of start time, end time, and duration.

Preferably, all of the first, second and third terminals and location servers support the SUPL protocol, and/or the LPP, and/or the LPPe.

All of the first, second and third location servers comprise at least one of: a home location server, a visitor location server and an emergency location server.

Preferably, from the standpoint of the transmission service of the location data, the location data may be divided into two types: assistance location data and SET position data.

The assistance location parameter: there are many kinds of assistance location parameters in the SUPL, generally comprising: Global location System (GPS) parameter, Global Navigation Satellite System (GNSS) parameter, real-time/predicted atmosphere, virtual assistance measurements, electromagnetic field information and the like, as well as indoor assistance location parameter, such as fingerprint and radiomap. In this case, both the SET and the SLP may send the assistance location data to the other party or other SETs.

The position data refers to the position information of the SET. Both the SET and the SLP may acquire the position information of the SET. In this case, both the SET and the SLP may need to send the position data to the other party or other SETs.

In a preferred implementation process, the first terminal may transmit location data to the second terminal. Similarly, the second terminal may also transmit location data to the first terminal. That is, the transmission may be either one-way (unsolicited) or two-way (solicited).

The process of transmitting location data from the first terminal to the second terminal is described below. The following preferred solution can also be applied in the scenario that the second terminal transmits location data to the first terminal, if there is no conflict.

Preferably, each of the location server, first location server and second location server comprise at least one of: a location server, a visitor location server and an emergency location server of a terminal.

Preferably, the first terminal transmits the location data to the second terminal in at least one of the following modes: the point-to-point short message transmission mode, point-to-point multimedia message transmission mode, HTTP transmission mode, e-mail transmission mode, file transmission protocol mode, transmission control protocol mode, UDP mode, SUPL transmission mode, LPP transmission mode, and LPPe transmission mode.

Preferably, the location data transmission between the first and second terminals comprises that: the first terminal directly transmits the location data to the second terminal in the point-to-point short message transmission mode, point-to-point multimedia message transmission mode, HTTP transmission mode, e-mail transmission mode or file transmission protocol mode.

The preferred implementation process above is described below in conjunction with the first preferred embodiment.

Figure 4:
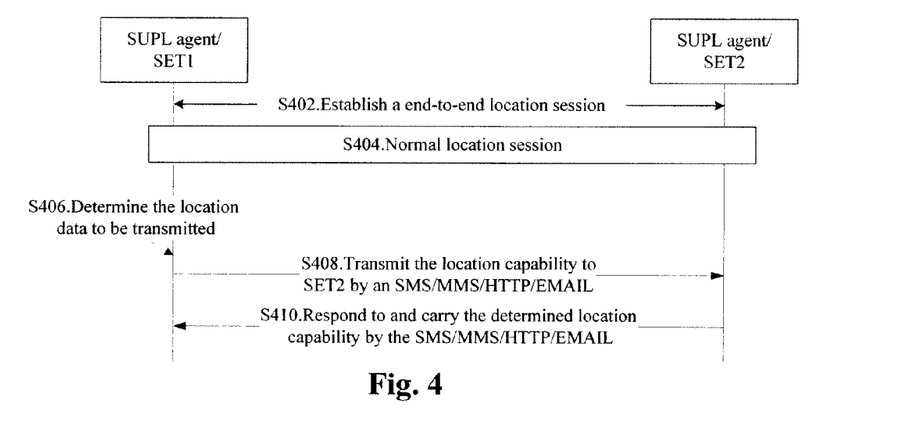
FIG. 4 is a flowchart of a method for transmitting location data according to the first preferred embodiment of the disclosure.

FIG. 4 is a flowchart of a method for transmitting location data according to the first preferred embodiment of the disclosure. As shown in FIG. 4, the method mainly comprises the following steps.

Step S402: A location session is established and the location data transmission capability is negotiated between SET1 and SET2.

Step S404: A normal SUPL session is performed between the two SETs.

Step S406: SET1 determines that some location data will be transmitted to SET2 (for example, SET1 acquires its own position data, or the SET acquires assistance location data, or acquires update of the position data or assistance location data etc.).

Step S408: The SUPL agent of SET1 transmits the location capability to SET2 by an SMS\MMS\HTTP\EMAIL or other modes.

Step S410: SET1 and SET2 continue the location session between two terminals.

It should be noted that Step S406 and Step S408 may be executed for many times without respective request of the other SET. Whether to execute is determined by SET1. Generally, SET1 acquires assistance location parameter or update thereof, or position information of the SET or update thereof etc., and then determines whether to execute.

Preferably, the location data transmission between the first and second terminals may further comprise: the first terminal transmits the location data to the second terminal through the first location server corresponding to the first terminal and the second location server corresponding to the second terminal in the SUPL or LPP or LPPe mode.

The preferred implementation process above is described below in conjunction with the second and third preferred embodiments.

Figure 5:
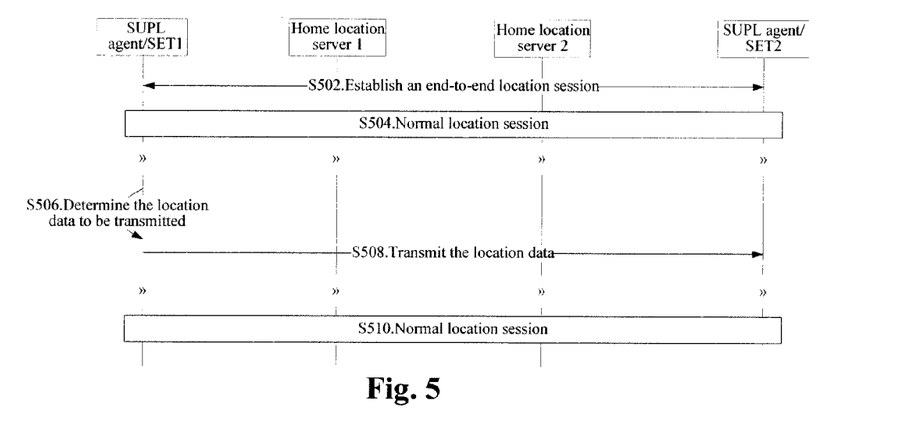
FIG. 5 is a flowchart of a method for transmitting location data according to the second preferred embodiment of the disclosure.

FIG. 5 is a flowchart of a method for transmitting location data (in a transparent transmission mode) according to the second preferred embodiment of the disclosure. As shown in FIG. 5, the method mainly comprises the following steps.

Step S502: A location session is established and the location data transmission capability is negotiated between SET1 and SET2.

Step S504: A normal SUPL session between two SETs is performed.

Step S506: SET1 determines that some location data will be transmitted to SET2 (for example, SET1 acquires its own position data, or the SET acquires assistance location data, or acquires update of the position data or assistance location data etc.).

Step S508: SET1 transmits the location data to the other SET in a transparent transmission mode of a location server.

Step S510: SET1 and SET2 continue the location session between two terminals.

It should be noted that Step S506 and Step S508 may be executed for many times without respective request of the other SET. Whether to execute is determined by SET1. Generally, SET1 acquires assistance location parameter or update thereof, or position information of the SET or update thereof etc., and then determines whether to execute.

Figure 6:
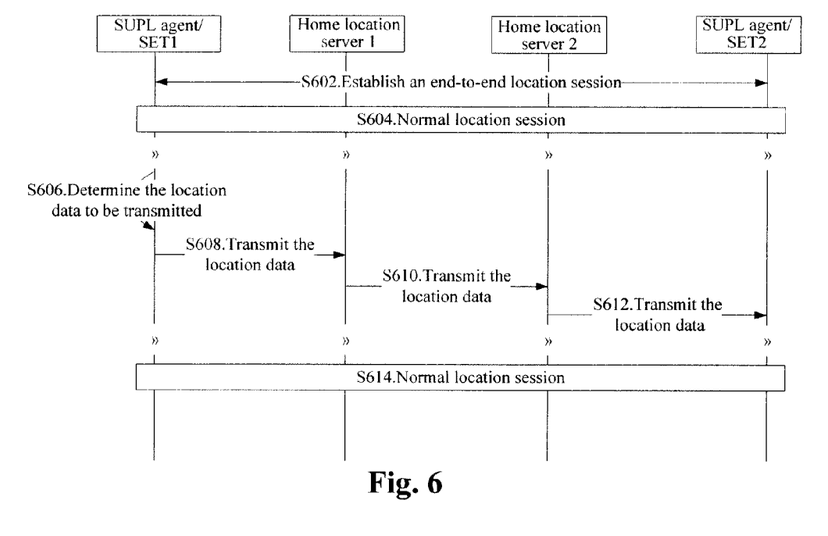
FIG. 6 is a flowchart of a method for transmitting location data according to the third preferred embodiment of the disclosure.

FIG. 6 is a flowchart of a method for transmitting location data (in a non-transparent transmission mode) according to the third preferred embodiment of the disclosure. As shown in FIG. 6, the method mainly comprises the following steps.

Step S602: A location session is established and the location data transmission capability is negotiated between two SETs.

Step S604: A normal SUPL session between two SETs is performed.

Step S606: SET1 determines that some location data will be transmitted to SET2 (for example, the SET acquires its own position data, or the SET acquires assistance location data, or acquires update of the position data or assistance location data etc.).

Step S608: SET1 transmits the location data to location server 1 (i.e., the first location server), to request it to forward the location data to target SET2.

Step S610: Location server 1 transmits the location data to location server 2 of the target SET.

Step S612: Location server 2 (i.e., the second location server) of the target SET transmits the location data to target SET2.

Step S614: The normal location session between SET1 and SET2 is continued.

It should be noted that Step S606, Step S608, Step S610 and Step S612 may be executed for many times without respective request of the other SET. Whether to execute is determined by SET1. For example, SET1 acquires assistance location parameter or update thereof, or position information of the SET or update thereof etc., and then determines whether to execute.

Preferably, the location data is transmitted between the first and second terminals in a continuous transmission mode or a discontinuous transmission mode.

The discontinuous transmission mode comprises a periodic transmission mode.

Preferably, after the third location server transmits the location data to the third terminal, the third terminal further transmits the received location data to another terminal through the location server corresponding to the third terminal and the location server corresponding to said another terminal in the SUPL and/or LPP and/or LPPe mode.

In the preferred implementation process, the location data may be transmitted by the first terminal for many times. Of course, when a transmission request is acquired, the location data may also be transmitted in an unsolicited mode (one-way), and is not limited to the solicited mode (request-response).

Preferably, the location data is transmitted between the third terminal and the third location server in a continuous transmission mode or a discontinuous transmission mode.

The discontinuous transmission mode may comprise a periodic transmission mode and a non-periodic transmission mode.

Preferably, the location server corresponding to the third terminal and the location server corresponding to said another terminal may be the same location server.

The location data transmission between a location server and a terminal is described below in conjunction with FIG. 7.

Figure 7:
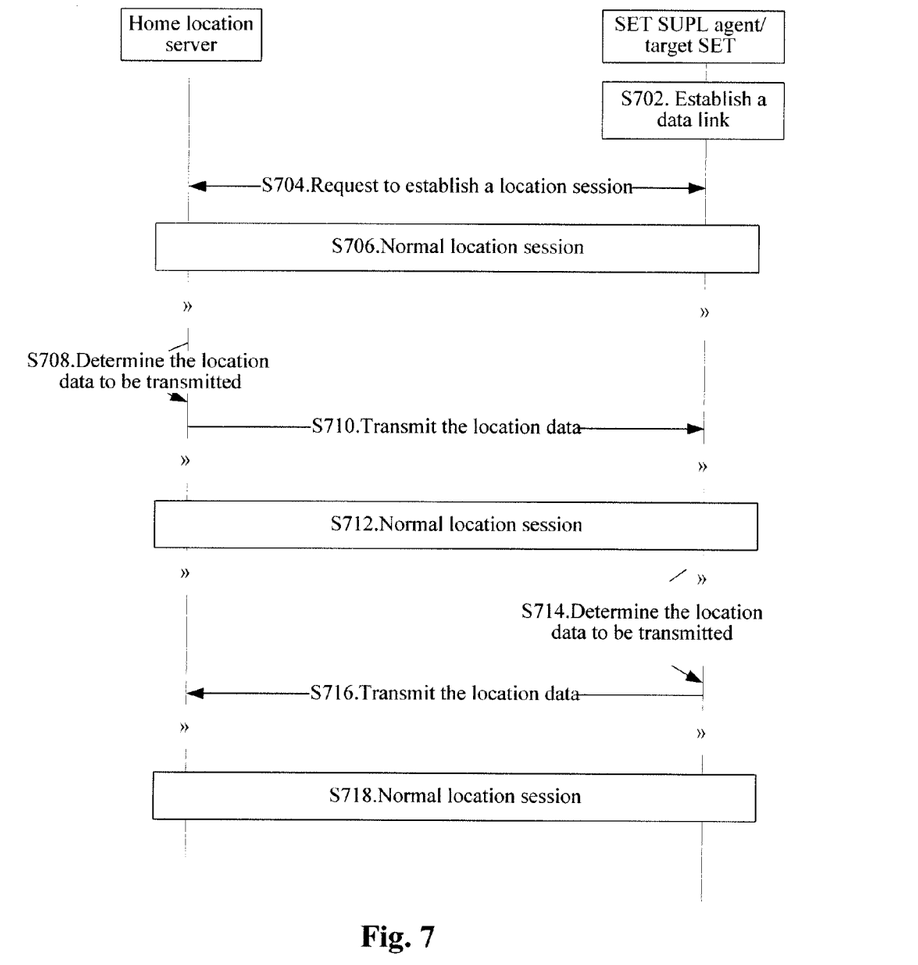
FIG. 7 is a flowchart of a method for transmitting location data according to the fourth preferred embodiment of the disclosure.

FIG. 7 is a flowchart of a method for transmitting location data according to the fourth preferred embodiment of the disclosure. As shown in FIG. 7, the method mainly comprises the following steps.

Step S702: A mobile SET establishes a data connection with a network side.

Step S704: An SET requests to establish a location session with a location server (H-SLP) and negotiates the location data capability.

Step S706: A normal location session between the SET and the location server is performed.

Step S708: The location server determines that some location data will be transmitted (such as the assistance location data or the SET position data).

In the preferred implementation process, the condition for determination may be the update of the assistance location data or SET position data.

Step S710: The location server transmits location data to the SET through an SUPL session channel.

Preferably, the location server may transmit the location data to the SET in a notification mode, i.e., carrying the location data in a notification message. The notification message may comprise the valid time range of the location data, such as the combination of any two of start time, end time, and duration.

Step S712: A normal location session between the SET and the location server is performed.

Step S714: The SET determines that some location data will be transmitted (such as the assistance location data or the SET position data).

In the preferred implementation process, the condition for determination may be the update of the assistance location data or SET position data.

Step S716: The SET transmits the location data to the location server through an SUPL session channel.

Step S718: A normal location session between the location server and the SET is performed.

Preferably, the first location server transmits the location data to the second location server in at least one of the following modes: the point-to-point short message transmission mode, point-to-point multimedia message transmission mode, HTTP transmission mode, e-mail transmission mode, file transmission protocol mode, transmission control protocol mode, UDP mode, SUPL transmission mode, LPP transmission mode, and LPPe transmission mode.

In the preferred implementation process, after acquiring the location data, any party (including SET1, SET2, the first location server or the second location server) may transmit the location data to another party or other SETs through an SUPL channel without acquiring the request of other parties. Of course, if other parties have requested for the transmission of the location data, the location data may also be transmitted to the other party as requested.

The preferred implementation process above is described below in conjunction with FIG. 8 and FIG. 9.

Figure 8:
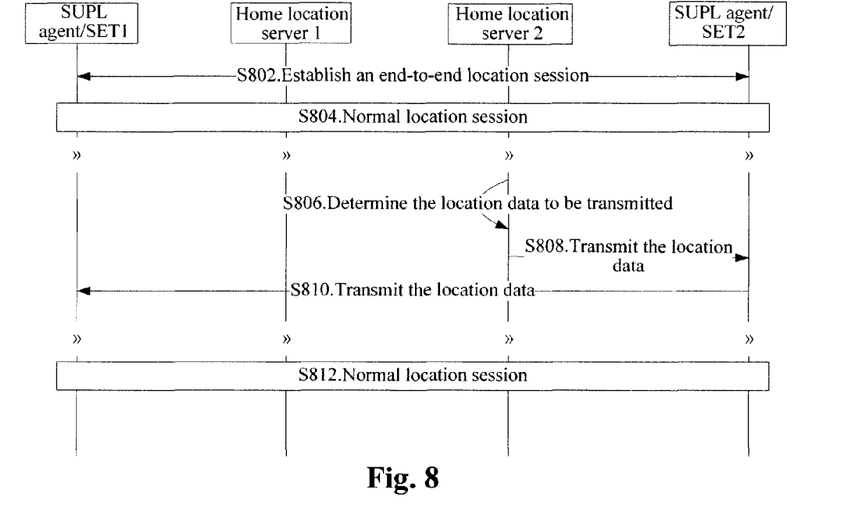
FIG. 8 is a flowchart of a method for transmitting location data according to the fifth preferred embodiment of the disclosure.

FIG. 8 is a flowchart of a method for transmitting location data according to the fourth preferred embodiment of the disclosure. As shown in FIG. 8, the method mainly comprises the following steps.

Step S802: A location session is established and the location data transmission capability is negotiated between two SETs.

Step S804: A normal SUPL session between two SETs is performed.

Step S806: Location server 2 of SET2 determines that some location data will be transmitted to the other SET. For example, location server 2 acquires the position data of SET2 or assistance location data, or acquires update of the position data or the assistance location data etc.

Step S808: Location server 2 transmits the location data to SET2.

Step S810: SET2 transmits the assistance location data to SET1 in the SLP transparent transmission mode.

Thereafter, a Dynamic Host Configuration Protocol (DHCP) server returns the address information of the location server of the local access network.

Step S812: The normal location session is continued.

It should be noted that Step S806, Step S808 and Step S810 may be executed for many times without respective request of the SET. Whether to execute is determined by location server 2. Generally, location server 2 acquires the assistance location parameter and update thereof, or the position information of the SET and update thereof etc., and then determines whether to execute.

Figure 9:
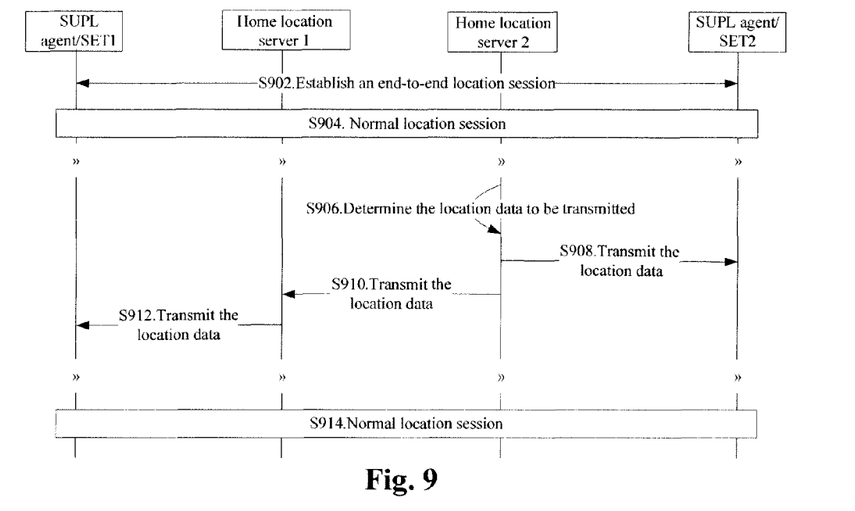
FIG. 9 is a flowchart of a method for transmitting location data according to the sixth preferred embodiment of the disclosure.

FIG. 9 is a flowchart of a method for transmitting location data according to the fifth preferred embodiment of the disclosure. As shown in FIG. 9, the method mainly comprises the following steps.

Step S902: A location session is established and location data transmission capability is negotiated between two SETs.

Step S904: A normal SUPL session between two SETs is performed.

Step S906: Location server 2 of SET2 determines that some location data will be transmitted to SET1. For example, location server 2 acquires the position data of SET2 or the assistance location data, or update of the position data or the assistance location data etc.

Step S908: Location server 2 transmits the location data to SET2.

Step S910: Location server 2 transmits the location data to location server 1 of SET1.

Step S912: The location server of SET1 transmits the location data to SET1.

Step S914: The location session between SET1 and SET2 is continued.

It should be noted that Step S906, Step S908, Step S910 and Step S912 may be executed for many times without respective request of the SET. Whether to execute is determined by location server 2. Generally, location server 2 acquires the assistance location parameter and update thereof, or the position data of the SET and update thereof etc., and then determines whether to execute.

Preferably, whether the location data needs to be transmitted is determined according to one of the following conditions: a local preset policy (such as, predetermined event triggering, and periodic transmission), local location data change, re-location session, receiving a location data transmission request message, etc.

Preferably, the first and second location servers are the same location server. That is, the first and second terminals correspond to the same location server. Of course, the first and second location servers may also be different location servers.

Figure 10:
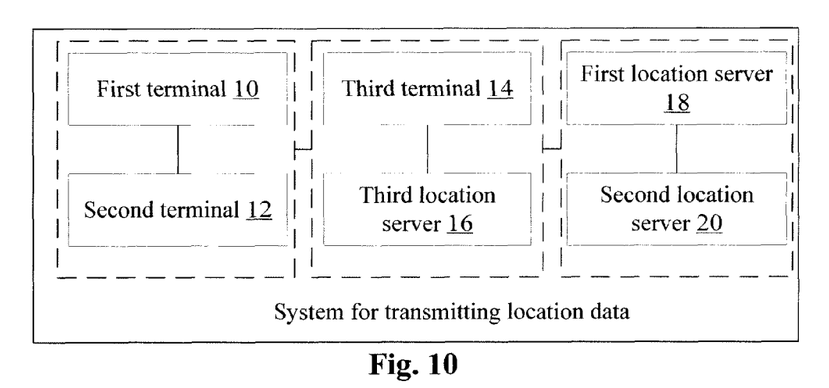
FIG. 10 is a block diagram showing the structure of a system for transmitting location data according to an embodiment of the disclosure.

FIG. 10 is a block diagram showing the structure of a system for transmitting location data according to the embodiment of the disclosure. The system for transmitting the location data according to the embodiment of the disclosure comprises at least one of:

(1) a first terminal 10 and a second terminal 12, between which the location data is transmitted;

(2) a third terminal 14 and a third location server 16, between which the location data is transmitted; and (3) a first location server 18 and a second location server 20, between which the location data is transmitted, wherein the location data comprises: assistance location data and/or position data.

By the embodiment, the location function between two terminals supporting the SUPL can be realized, and some novel assistance location data can be transmitted as well.

Preferably, all of the first terminal 10, second terminal 12 and third terminal 14 and the third location server 16, first location server 18, second location server 20 can support the SUPL protocol and/or LPP, and/or LPPe.

Preferably, each of the third location server 16, first location server 18, second location server 20, comprises at least one of the following components: a location server, a visitor location server and an emergency location server of a terminal.

Figure 11:
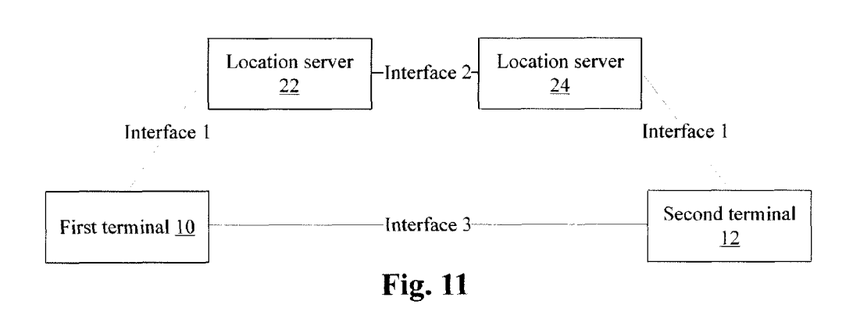
FIG. 11 is a diagram showing the structure of a system for transmitting location data according to a preferred embodiment of the disclosure.

Preferably, as shown in FIG. 11, the system may further comprise: a location server 22 corresponding to the first terminal and a location server 24 corresponding to the second terminal, wherein the first terminal 10 is configured to transmit the location data through the location server 22 corresponding to the first terminal and the location server 24 corresponding to the second terminal in the SUPL session and/or LPP and/or LPPe mode, and the second terminal 12 is configured to receive the location data from the first terminal 10.

Preferably, as shown in FIG. 11, the preferred system comprises: SET1, SET2, location server 1, location server 2 and the interfaces thereof: interface 1, interface 2 and interface 3.

In the above, the location data may be transmitted between SET1 and location server 1 through interface 1, and the location data may be transmitted between SET2 and location server 2 through interface 2. Two location servers may provide transmission service of the location data between SET1 and SET2 through interface 2 either in a transparent transmission mode (as shown in FIG. 5) or in a non-transparent transmission mode (as shown in FIG. 6). The interface (interface 3) between SET1 and SET2 is a logic interface, through which the location data may be transmitted between SET1 and SET2. Of course, the data may also be directly transmitted between SET1 and SET2 in the point-to-point short message transmission mode, point-to-point multimedia message transmission mode, HTTP transmission mode, e-mail transmission mode, or file transmission protocol mode.

Preferably, the location server 22 corresponding to the first terminal and the location server 24 corresponding to the second terminal may be the same location server.

Preferably, the system may further comprise: a location server 26 (not shown in FIG. 11) corresponding to the third terminal 14 and a location server 28 (not shown in FIG. 11) corresponding to another terminal; and the third terminal 14 is further configured to transmit the location data received from the third location server to said another terminal through the location server 26 corresponding to the third terminal 14 and the location server 28 corresponding to said another terminal in the SUPL and/or LPP and/or LPPe mode.

Preferably, the location server 26 corresponding to the third terminal and the location server 28 corresponding to another terminal may be the same location server.

In the related arts, the assistance location data and the position data are transmitted in one-time delivery mode and in a solicited mode (request-response). In the preferred implementation process of the disclosure, the assistance location data and the position data may be transmitted for many times in either a solicited mode or an unsolicited mode. Specifically, after acquiring the location data, any party (including the SET or the location server) may transmit the location data to another party or other SETs through the SUPL channel without acquiring the requests of other parties. Of course, if other parties have requested for the transmission of the location data, the location data may also be transmitted to the other party as requested.

In addition, the location data may be transmitted from the SET to the H-SLP, from the H-SLP to the SET and from one SET to another SET.

In the above, in the situation that the location data is transmitted from the SET to the SLP and in the situation that the location data is transmitted from the SLP to the SET, that is, the SET or the SLP transmits the location data to the other party after acquiring the location data, it may be either in a continuous mode or in one-time delivery mode.

The continuous mode may comprise: 1, multiple times transmission; 2, periodic transmission; 3, event-triggered transmission; 4, transmission upon any data update; and 5, solicited mode (request-response) etc.

The one-time delivery mode refers to: 1, the SLP or the SET transmits the location data to the other party either in the solicited mode (request-response) or in the unsolicited mode (direct transmission) after acquiring the location data.

Preferably, the terminal and the location server may determine whether the location data needs to be transmitted according to one of the following conditions: local preset policy (such as predetermined event triggering and periodic transmission), local location data change, re-location session, and receiving a location data transmission request message etc.

It should be noted that each embodiment above is implemented based on the SUPL technology and may also be implemented based on other technologies in case of no conflict, such as the LPP technology and LPPe technology.

To sum up, through the transmission solution for the location data provided by the embodiments of the disclosure, the location data may be transmitted from the SET to the H-SLP, from the H-SLP to the SET and from one SET to another SET. Moreover, when it is determined that the location data needs to be transmitted, the SET or the H-SLP may transmit the location data for many times. Therefore, the location data may be transmitted between one or more terminals supporting the SUPL, thereby realizing the location function between two terminals.

Obviously, those skilled in the art should understand that each module or step of the disclosure may be implemented by general computing devices and centralized in a single computing device, or allocated in a network consisting of multiple computing devices. Optionally, the modules or steps may be implemented by program codes executable by the computing devices, so that they may be stored in a storage device to be executed by the computing device, or respectively made into integrated circuit modules or a single integrated circuit module. As such, the disclosure is not limited to any specific combination of hardware and software.

The above are only preferred embodiments of the disclosure and should not be used for limiting the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A method for transmitting location data, applied in a Security User Plane Location (SUPL) system, comprising at least one step of:
   transmitting the location data between a first terminal and a second terminal;
   transmitting the location data between a first location server and a second location server; and
   transmitting the location data between a third terminal and a third location server,
   wherein the location data comprises: assistance location data and/or position data,
   the location data transmission between the first terminal and second terminal comprises: transmitting the location data to the second terminal by the first terminal through a location server corresponding to the first terminal and a location server corresponding to the second terminal in the SUPL transmission mode and/or the LPP transmission mode and/or the LPPe transmission mode, and
   the location data is transmitted between the first terminal and second terminal in a continuous transmission mode or a discontinuous transmission mode.

2. The method according to claim 1, wherein the first terminal, the second terminal, the third terminal, the first location server, the second location server and the third location server support the SUPL protocol, and/or the Long Term Evolution Positioning Protocol (LPP), and/or the Long Term Evolution Positioning Protocol Extension (LPPe); or
   each of the first location server, the second location server and the third location server comprises at least one of: a home location server, a visitor location server and an emergency location server; or
   the location data is transmitted between the first terminal and the second terminal, between the third terminal and third location server, and between the first location server and second location server in at least one mode of: a point-to-point short message transmission mode, a point-to-point multimedia message transmission mode, a Hyper Text Transmission Protocol (HTTP) transmission mode, an e-mail transmission mode, a file transmission protocol mode, a transmission control protocol mode, a User Datagram Protocol (UDP) mode, an SUPL transmission mode, an LPP transmission mode, and an LPPe transmission mode.

3. The method according to claim 2, wherein the location data transmission between the first terminal and second terminal comprises:
   transmitting the location data to the second terminal by the first terminal through a location server corresponding to the first terminal and a location server corresponding to the second terminal in the SUPL transmission mode and/or the LPP transmission mode and/or the LPPe transmission mode.

4. The method according to claim 3, wherein the location data is transmitted between the first terminal and second terminal in a continuous transmission mode or a discontinuous transmission mode.

5. The method according to claim 2, wherein a location server corresponding to the first terminal and a location server corresponding to the second terminal are the same location server.

6. The method according to claim 1, wherein a location server corresponding to the first terminal and a location server corresponding to the second terminal are the same location server.

7. The method according to claim 1, wherein the location data is transmitted from the third terminal to the third location server, or from the third location server to the third terminal, or between the first location server and the second location server in a continuous transmission mode or a discontinuous transmission mode.

8. The method according to claim 7, wherein the discontinuous transmission mode comprises a periodic transmission mode.

9. The method according to claim 8, wherein after the third location server transmits the location data to the third terminal, the method further comprises:
   transmitting the location data to another terminal by the third terminal through a location server corresponding to the third terminal and a location server corresponding to said another terminal in the SUPL transmission mode and/or the LPP transmission mode and/or the LPPe transmission mode.

10. The method according to claim 9, wherein the location server corresponding to the third terminal and the location server corresponding to said another terminal are the same location server.

11. A system for transmitting location data, applied in a Security User Plane Location (SUPL) system, comprising at least one of:
    a first terminal and a second terminal, between which the location data is transmitted;
    a first location server and a second location server, between which the location data is transmitted; and
    a third terminal and a third location server, between which the location data is transmitted,
    wherein the location data comprises assistance location data and/or position data, and
    the system further comprises: a location server corresponding to the third terminal, and a location server corresponding to another terminal; and the third terminal is further configured to transmit the location data received from the third location server to said another terminal through the location server corresponding to the third terminal and the location server corresponding to said another terminal in the SUPL transmission mode and/or the LPP transmission mode and/or the LPPe transmission mode.

12. The system according to claim 11, wherein the first terminal, the second terminal, the third terminal, the first location server, the second location server and the third location server support the SUPL protocol, and/or the Long Term Evolution Positioning Protocol (LPP), and/or the Long Term Evolution Positioning Protocol Extension (LPPe); or
    each of the first location server, the second location server and the third location server comprises at least one of: a home location server, a visitor location server and an emergency location server.

13. The system according to claim 12, wherein
    the system further comprises: a location server corresponding to the first terminal and a location server corresponding to the second terminal;
    the first terminal is configured to transmit the location data through the location server corresponding to the first terminal and the location server corresponding to the second terminal in the SUPL transmission mode and/or the LPP transmission mode and/or the LPPe transmission mode, and
    the second terminal is configured to receive the location data from the first terminal.

14. The system according to claim 13, wherein the location server corresponding to the first terminal and the location server corresponding to the second terminal are the same location server.

15. The system according to claim 11, wherein
the system further comprises: a location server corresponding to the first terminal and a location server corresponding to the second terminal;
the first terminal is configured to transmit the location data through the location server corresponding to the first terminal and the location server corresponding to the second terminal in the SUPL transmission mode and/or the LPP transmission mode and/or the LPPe transmission mode, and
the second terminal is configured to receive the location data from the first terminal.

16. The system according to claim 15, wherein the location server corresponding to the first terminal and the location server corresponding to the second terminal are the same location server.

17. The system according to claim 11, wherein the location server corresponding to the third terminal and the location server corresponding to said another terminal are the same location server.

* * * * *